Jan. 1, 1963　　　　M. R. FELLMAN　　　　3,070,923
STRUCTURAL TRUSS AND JOINT FOR USE THEREWITH
Filed Oct. 5, 1960　　　　　　　　　　3 Sheets-Sheet 1

INVENTOR.
MORTON R. FELLMAN
BY
*Salter & Michaelson*

INVENTOR.
MORTON R. FELLMAN
BY Salter & Michaelson

Jan. 1, 1963     M. R. FELLMAN     3,070,923
STRUCTURAL TRUSS AND JOINT FOR USE THEREWITH
Filed Oct. 5, 1960     3 Sheets-Sheet 3

INVENTOR.
MORTON R. FELLMAN
BY
Salter & Michaelson

United States Patent Office 3,070,923
Patented Jan. 1, 1963

3,070,923
STRUCTURAL TRUSS AND JOINT
FOR USE THEREWITH
Morton R. Fellman, Miami, Fla., assignor to Redi Truss International, Inc., Miami, Fla., a corporation of Florida
Filed Oct. 5, 1960, Ser. No. 60,725
25 Claims. (Cl. 50—55)

The present invention relates to a structural truss and to a joint for use therewith. More particularly, the present invention relates to a roof truss that is composed of truss members that overlap at the joints thereof, teeth being formed in the truss members in the area of the overlap and interlocking to cause the joints to develop the full shear strength required of each member.

Roof trusses for use in building constructions normally include top chord members that are joined to bottom chord members adjacent the outer support therefor and that are further interconnected to the bottom chord members through intermediate web members. Until recently, it has been the custom in the construction of residential type dwellings to erect the roof trusses by conventional framing. Prior to the instant invention it was discovered that prefabricating the roof trusses and installing them as complete units at the home site not only resulted in a more economical truss, but that the prefabricated truss was actually stronger and capable of withstanding greater loads than those trusses constructed in the conventional manner. In one form of the prior known prefabricated truss, the truss members were disposed in overlapping relation at the connected ends thereof. The joints that connected the truss members together were defined by a bolt and split ring assembly, the bolt extending through suitable openings formed in the overlapping ends of the truss members. In this type of joint, the truss was not only bulky in handling because of the increased thickness of the joints due to the overlapping ends, but further because of the accessory elements utilized in the assembly, considerable time and effort was required to assemble the truss. Another type of joint for use in a prefabricated truss utilized a pair of metal or plywood gusset plates that were secured to the members by a multiplicity of nails and/or glue, the plates overlapping the adjacent edges of the truss members that engaged each other in abutting relation. In this type of truss, the strength of the joints defined by the metal plates depended on various factors, such as the depth of the teeth, their shape and configuration, the finish of the metal, the angle of attack of the teeth to the wood, the accuracy and age of the die forming the teeth, the type of machine for pressing the teeth into the wood truss members, the speed of the pressing operation, the amount, if any, of foreign products, such as oil, on the plates, the quality and gauge of the plate and the grade of wood used. In the assembly operation, great care had to be taken to properly position the plates so as to insure a tight fit of the members and a proper camber for the truss. Due to the fact that the angle of attack of the teeth varied because of mishandling of the plates or wear of the dies that made the plates, the strength of the plates was subject to change, thereby causing a possibility of weakness in the truss construction. The plate type of joint was further objectionable since in assembly of the trusses, special tables with hydraulic or mechanical means for holding the truss members in place were required, and rollers or presses were also necessary to press the teeth of the plates into the truss members. A further objection to the use of the plates for joining the truss members was that a large inventory of plates had to be available, since there were numerous types of spans used. Each span required a different type or size of plate, and in order to service the request for any type span, a great variety of the plates had to be kept on hand at all times.

The present invention avoids the difficulties experienced in the joints of the prior known truss constructions by providing a unique joint that represents a complete departure from any joint ever used in truss assemblies, completely eliminating the need for plates or gussets. Essentially, the joint embodied herein is defined by overlapping areas of adjacent members, each member being formed with a plurality of teeth that are cut in the material from which the member is formed in a side surface or wide face thereof and in the area of the overlap. The members are interlocked by means of the teeth formed in the wide faces therein, the teeth having the usual capacity to transfer the stresses between the members. In spite of the fact that the teeth are cut out of the wood, the joint resulting from the overlapping chord members develops the full shear strength of each member in the area of the overlap. Furthermore, the heel joints which are defined by the overlapping top chord members and bottom chord members enable the truss to carry greater load capacities in that the smaller the slope of the truss, the more area of overlap of the top chord and bottom chord members, and therefore the greater the strength of the joint. Thus, for any given vertical loading on the truss, the member stresses increase as the slope of the top chord member decreases, and the strength of the joint between the members also increases to satisfy the needs of the truss. The present invention also incorporates several variations in the truss construction so as to eliminate certain wood web members that are normally associated with roof trusses. In the variation of the invention embodied herein, prestressed or pretensioned members of metal material are employed and cooperate with the interlocking chord members to cause the teeth in the interlocking or overlapping areas to more tightly engage each other, wherein the joints develop the full shear strength of each member in the area of the overlap and have the capacity to resist large forces under load.

In one form of the invention, the teeth that are formed in the truss members are saw-tooth in configuration, the sawteeth interlocking to define a bearing surface and opposed shear planes. The shear planes are expressly formed of a greater dimension than the bearing surface since the load capacity of wood in shear is considerably less than the load capacity of wood in bearing.

Accordingly, it is an object of the present invention to provide a roof truss wherein the truss members are interlocked to each other without the aid of plates or other connector members.

Another object of the present invention is to provide a truss construction wherein the members thereof are formed with teeth that are adapted to interlock the teeth of an adjacent member in an area of overlap, the overlapping area defining a joint that develops the full shear strength required of each member.

Still another object is to provide a joint for use in a truss construction which is defined by overlapping members that are formed with teeth, the teeth being cut in the material from which the members are formed.

Still another object is to provide a structural joint wherein a first member is formed with teeth therein that are adapted to be interlocked with teeth formed in a second member, the interlocking teeth of each member absorbing the stresses developed when the members are loaded and distributing the stresses between the members.

Still another object is to provide a roof truss which includes tension and compression web members, the compression members being joined to the chord members of the truss by means of overlapping areas, and the tension members being formed of a metal material and being prestressed or pretensioned to cause the interlocking teeth of the chord members to be more firmly engaged together.

Still another object is to provide a truss construction wherein the top chord members are secured at the peak joint by interlocking teeth formed therein, the bearing surfaces of the interlocking teeth effectively resisting the compression forces present at the peak joint and thereby, in effect, causing the top chord members to act as a continuous one-piece member.

Still another object is to provide a tooth design for use in precut truss members wherein the bearing surfaces of the teeth are formed of a dimension less than that of the shear plane defined by said teeth.

Other objects, features and advantages of the invention will become apparent as the description thereof proceeds when considered in connection with the accompanying illustrative drawings.

In the drawings which illustrate the best mode presently contemplated by me for carrying out my invention.

Referring now to the drawings and particularly to FIGS. 1 through 5, one form of the truss construction embodied herein is generally indicated at 10 and includes top chord members 11 and 12, bottom chord members 14 and 16, compression web members 18 and 20, and tension web members 22 and 24. The top and bottom chord members and web members are preferably constructed of standard two-by-four wood pieces and are connected together as will be described below. The top chord members 11 and 12 are inclined and are joined at one end thereof to define an apex or peak joint generally indicated at 26, while the bottom chord members 14 and 16 may be interconnected at the centermost point of the truss and are further joined to the top chord members 11 and 12, respectively, at the outermost ends thereof to define heel joints generally indicated at 28 and 29. Although in some truss assemblies a single bottom chord is employed, it may be stated that as a general rule the bottom chord arrangement is such that there are the same number of bottom chord members as there are top chord members.

Figure 4:
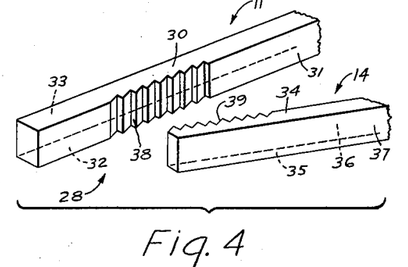
FIG. 4 is an enlarged fragmentary and exploded view of the left heel joint of the truss illustrated in FIG. 1.
Figure 5:
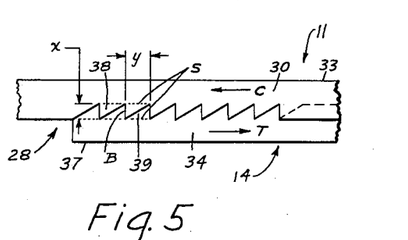
FIG. 5 is an enlarged plan view of the heel joint shown in FIG. 4.

As stated above, each of the chord members is preferably formed of a two-by-four wood piece, and a side surface or wide face thereof adjacent the outermost ends is cut out to define a plurality of teeth, the apices of which, as shown, extend in a generally vertical direction when the chord members are located in their position of use in the truss assembly. Although the apices of the teeth of the truss members are illustrated as extending in a generally vertical direction when the truss members are located in their position of use, it is contemplated on occasion to incline their direction with respect to the vertical, particularly at the truss heel joints, so as to increase the interlocking action of the teeth. The degree of inclination will depend on the pitch of the truss and may vary in accordance with the loading requirements to make more efficient use of the chord members. It is understood that the function of the inclined teeth is identical to the function of the generally vertical teeth, and therefore the description and showing of the generally vertical teeth is intended to encompass the use of inclined teeth. Referring now to FIGS. 4 and 5, the interrelation of the coacting teeth of the chord members 11 and 14 is shown, the heel joint 28 being taken as an illustration of the joint embodied in the present invention. As illustrated in FIG. 4, the top chord member 11 is inclined to the horizontal with respect to the bottom chord member 14 and is formed with a relatively narrow top edge 30 and a relatively wide inner side surface or face 31. A corresponding narrow bottom edge 32 and opposed side surface 33 make up the complete top chord member 11. The bottom chord member 14 is formed similarly to the top chord member 11 and includes narrow top and bottom edges 34 and 35 and wide inner and outer faces 36 and 37. Cut into the wide inner face 31 of the top chord member 11 are a plurality of teeth 38 that as shown have a sawtooth-like configuration, while similarly formed complementary sawteeth 39 are formed in the wide inner face 36 of the bottom chord member 14. Since the outer edge of the top chord member 11 is designed to overhang the outer end of the bottom chord member 14, the teeth 38 do not extend to the outer edge of the top chord member, whereas the teeth 39 that are cut in the face 36 extend to the very end of the bottom chord member. Prior to cutting the teeth 38 and 39 in the chord members, the pitch of the truss is first determined so that when the chord members are overlapped at their ends, the correct interlocking of the teeth will automatically assure that the chord members will be positioned in accordance with the required truss design.

Referring now to FIG. 5, the wide faces 31 and 36 are shown overlapping adjacent the outer ends thereof, the teeth 38 and 39 being disposed in interlocking relation in the area of the overlap. The teeth 38 and 39 are designed in such a way as to provide for a maximum loading capacity at the heel joint and to compensate for the combined compression and tension forces that are present in the top and bottom chord, respectively, when the truss is under load. The bearing surface of each tooth represented by the letter "B" is formed perpendicular to the direction of the tension and compression forces indicated by the arrows "T" and "C" and is thus designed to develop the full bearing stress required in the members in the area of the overlap thereof when the truss is under load. Since the shear plane of each tooth represented by the letter "S" has less capacity than the bearing surface "B" to carry loads when the heel joint is subjected to tension and compression, this plane is formed of a dimension somewhat greater than that of the bearing surface "B." The relationship between the shear plane "S" and the bearing surface "B" is illustrated in FIG. 5, the dimension "Y" being somewhat greater than the dimension "X." By forming the shear plane "S" in the manner indicated, the shear stresses are effectively distributed between the top and bottom chord members, the material in which the teeth are formed acting to carry the loads in the area of the overlap and developing the full shear strength required of each member in the overlapping area.

The joint embodied herein has the further advantage of increasing the loading capacity of the truss as the slope of the truss decreases. Thus, the shallower the slope of the truss, the more area of overlap of the top and bottom chord members, and therefore the greater strength of the joint. It is seen, therefore, that for any given vertical loading on the truss, the member stresses increase as the slope of the top chord members decrease, and accordingly, the strength of the heel joints also increases in accordance with the requirements of the truss.

Figure 1:
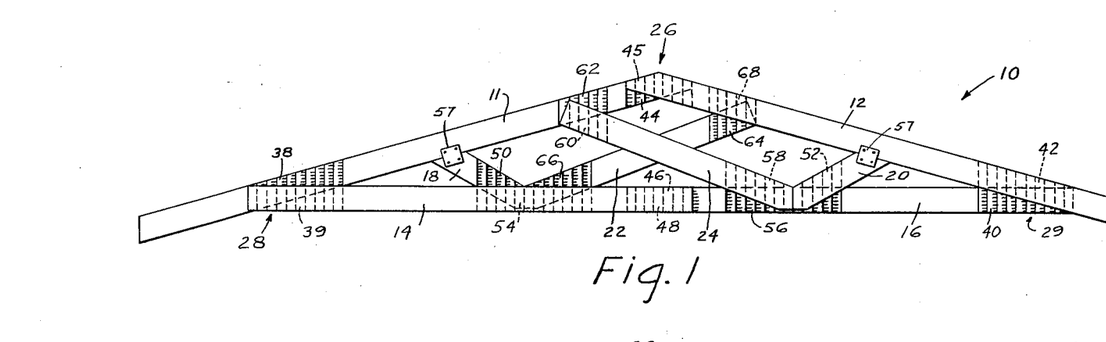
FIG. 1 is a front elevational view of one form of the truss construction embodied herein showing the interconnecting chord and web members that are formed with interlocking teeth in the side surfaces thereof.

As seen in FIG. 1, the heel joint 28 defines the left-hand heel joint of the truss 10. It is understood that the right-hand heel joint 29 is similarly formed, the top chord member 12 and the bottom chord member 16 having an area of overlap in which teeth 40 formed in the bottom chord member 16 are disposed in interlocking relation with corresponding teeth 42 formed in the top chord member 12. The peak joint 26 is also defined by an interlocking joint similar to the joint 28 wherein a plurality of teeth 44 are formed on the wide inner surface of the top chord member 11 and teeth 45 are formed on the wide inner surface of the chord member 12. The teeth formed on the top chord members 11 and 12 thus interlock at the peak joint 26 to define an overlapping area of the top chord members. The bottom chord members 14 and 16 are also shown overlapping at or near the centermost point thereof, the overlapping portions being formed with interlocking teeth 46 and 48, respectively, that coact to develop the full shear strength required of the chord members in the area of the overlap. It is pointed out that the direction of the sawteeth 46, 48 is directly opposite to the direction of the sawteeth 44 and the corresponding interlocking teeth 45 since the splice joint for the bottom chord members 14 and 16 is a tension joint while the peak joint 26 is a compression joint. In this connection reference is made to FIGS. 2 and 3.

Figure 2:
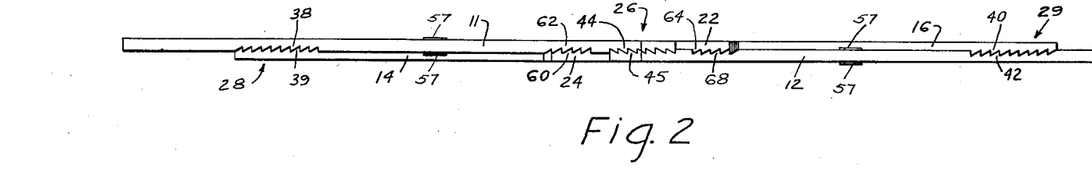
FIG. 2 is a top plan view of the truss construction illustrated in FIG. 1.
Figure 3:
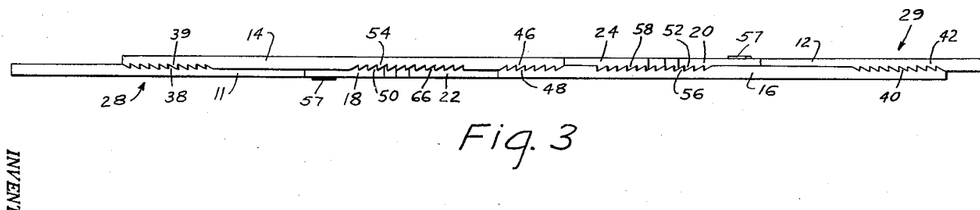
FIG. 3 is a bottom plan view of the truss illustrated in FIG. 1.

The compression web members 18 and 20 are secured to the bottom chord members 14 and 16, respectively, by means of similarly formed interlocking teeth 50 and 52, respectively, that are cut into the inner faces thereof. However, as seen in FIG. 1, the compression web member 18 is located on the inner side of the bottom chord member 14, while the compression web member 20 engages the bottom chord member 16 on the outer side thereof. Accordingly, teeth 54 are formed on the bottom chord member 14 on the inside surface thereof while teeth 56 are formed on the bottom chord member 16 on the outside surface thereof. As will be pointed out hereinafter, it is important that the intermediate portions of the top chord members no be reduced in section by cutting the teeth therein; hence the upper ends of the compression web members 18 and 20 are secured to the top chord members 11 and 12 in abutting relation therewith, plates indicated at 57 overlapping the top chord members and the compression web members to secure the compression web members in position. The tension web members 22 and 24 are also interlocked to the top and bottom chord members and extend between the top chord member 12 and bottom chord member 14 and the top chord member 11 and bottom chord member 16, respectively. Each of the tension web members is formed with upper and lower teeth in the surfaces thereof that face the chord members and are adapted to be interlocked with similarly formed teeth in the top and bottom chord members. For example, the lower teeth 58 formed in the tension member 24 engage the teeth 56 formed in the bottom chord member 16, while upper teeth 60 engage teeth 62 formed in the top chord member 11. Similarly, top and bottom teeth 64 and 66 formed in the tension web member 22 engage coacting teeth 68 and 54 formed in the top and bottom chord members 12 and 14, respectively. As shown in FIG. 2, the direction of the interlocking sawteeth 60, 62 and interlocking sawteeth 64, 68 are opposite to the direction of interlocking sawteeth 44, 45 at the peak joint 26, since the joints defined by the tension web members 22, 24 and the top chord members 11 and 12, respectively, are in tension, while the joint defined by the top chord members 11, 12 at the peak of the truss is in compression.

Although not shown in the drawings, the tension web members 22 and 24 are adapted to be interlocked in some fashion in the area of the overlap thereof. Vertically formed teeth may be cut in each tension web member in the area of the overlap thereof and interengaged as hereinabove described, or, if desired, one half of the width of each tension web member may be rabbeted out in the area of the overlap, the rabbetted areas being interfitted together.

The chord and web members may be initially secured together in the assembly thereof by any suitable retaining means, such as nails, or staples, but such external fastening means will not affect the distribution of forces in the area of the overlapping teeth as discussed above. Glue may also be utilized to join the overlapping members together and to resist reverse stresses and in alternative tooth designs may aid in the efficiency of the joint. In this connection, the glue serves to prevent the joints from separating laterally. Since the truss members all overlap at the ends thereof and are interlocked by their interengaging teeth, the total thickness of the assembly is constant at all joints, which arrangement provides for simple packaging.

The present invention also takes advantage of the fact that the teeth cut into the truss members provide a wood-to-wood joint that permits the most efficient use of the material from which the members are formed. The teeth are located in the truss members where the combined stresses are lower than the areas where there are no teeth cut. Thus at the heel joint only the direct stresses, such as tension in the botom chord members, and compression in the top chord members, occur. The bending or moment stresses induced by uniform loading from the roof deck occur between the heel and peak joints, direct stresses also occuring at these points. Thus since there are no reductions in the sections of the chord members intermediate the ends thereof, the maximum combined stresses occur at the points where the full area of the wood acts to resist them. In this connection, it has been calculated that at the peak joint, for example, where teeth are cut in the top chord members, the moment stresses are approximately 30 percent less than at the intermediate point of the top chord member. The direct stresses at the peak joint are also considerably less than in the lower end section of the top chord member, which are not reduced by cutting of the teeth therein. Thus there is more than sufficient wood in the top chord members to carry the loads imposed thereon even after the teeth are cut in the outermost ends thereof. Similarly, the teeth are cut at the splice joint in the bottom chord members where the moment stresses are lower than elsewhere along the chord lengths, and where the direct (tension and compression) stresses are lower than at the outermost ends thereof. Hence it is seen that the critical stresses in the truss occur where there are no teeth cut to reduce the load carrying capacity of the wood, and the joints between the members in effect produce a continuity between the truss members that provides for lower deflections and structural economies over any truss known heretofore. The interlocking members thus act to resist bending as well as direct stresses, which is distinct from the prior known type of joint for prefabricated trusses wherein the metal or gusset plates have no effective resistance to bending stresses.

Figure 6:
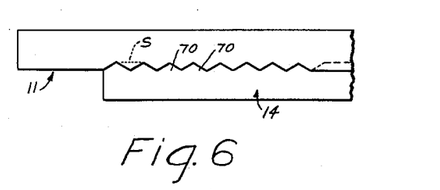
FIG. 6 is an enlarged plan view similar to FIG. 5 showing a modified form of tooth construction.

Referring now to FIGS. 6 through 9, several variations in the design of the interlocking teeth are illustrated, it being understood, that the truss construction 10 as illustrated in FIG. 1 would also be employed when incorporating any of the modified forms of the interlocking teeth. In FIG. 6, a straight-tooth design is illustrated wherein the teeth indicated at 70 are defined by equally dimensioned sides. In this form of tooth design, the shear plane represented by the letter "S" is relatively long, but there are no direct bearing surfaces due to the inclined formation of the teeth sides. In this tooth design, it is contemplated to apply glue to the teeth surfaces which will act to prevent separation of the joint in both tension and compression.

Figure 7:
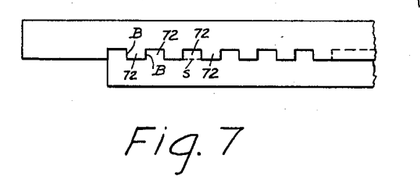
FIG. 7 is an enlarged view similar to FIG. 5 showing a further variation of the tooth construction wherein the teeth are square in formation.

Referring to FIG. 7, a square-tooth design is illustrated where the teeth are indicated at 72. In this form of tooth design, the bearing surfaces "B" act to resist tension and compression stresses but the shear plane "S" is reduced. This form of tooth design may be employed when the stress requirements are somewhat less than in the saw-tooth design.

Figure 8:
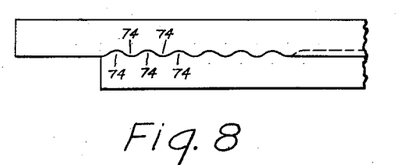
FIG. 8 is a view similar to FIG. 5 showing another variation of the tooth construction wherein the teeth are formed in a corrugated configuration.

A corrugated tooth design is illustrated in FIG. 8, the teeth being indicated at 74. Since there are no straight bearing surfaces in this tooth design, glue would also be applied to the interlocking teeth surfaces to aid in preventing separation of the teeth in both tension and compression. In the absence of straight bearing surfaces, the stress requirements are lower, although the shear plane has been increased by the corrugated sections.

Figure 9:
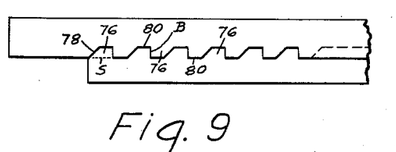
FIG. 9 is a view similar to FIG. 5 illustrating another variation of tooth design.

In FIG. 9 a modified saw-tooth design is illustrated wherein truncated sawteeth indicated at 76 are formed with an inclined surface 78 as well as a bearing surface "B." However, since the shear plane "S" has been reduced by the straight outer edge 80, glue may be applied to the edge 80 to increase the strength of the shear plane, thereby acting to prevent the joint from separating due to various shear stresses.

Figure 10:
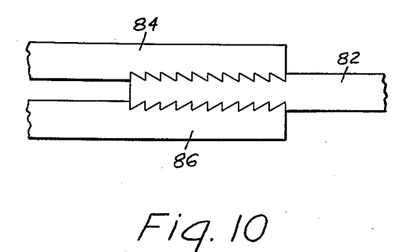
FIG. 10 is a further variation of a joint showing overlapping members that are disposed in compression, the interlocking teeth being especially formed for the compression joint.
Figure 11:
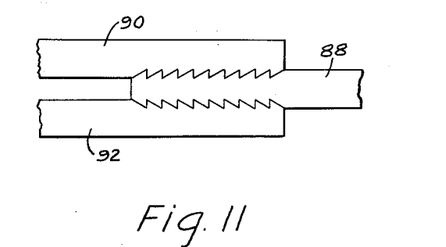
FIG. 11 is a joint similar to FIG. 9 wherein the interlocking teeth are especially designed for a tension joint.

As indicated in FIGS. 10 and 11, teeth may be cut in any one member on both sides so as to engage two other members without materially reducing the strength of the truss for those reasons discussed above. In FIG. 10 a modified form of a joint is illustrated wherein a member 82 is adapted to be inserted between overlapping members 84 and 86. The construction of the teeth in the members 82, 84 and 86 is such as to provide a compression joint between the overlapping members. The tooth design in FIG. 11 is such as to provide a tension joint, the teeth being formed in a member 88 and overlapping members 90 and 92 and being oppositely pitched from the teeth in the compression joint illustrated in FIG. 10. Although the joints shown in FIGS. 10 and 11 are intended for use in a roof truss, it is also contemplated to employ such a design in adjustable wood columns where large load carrying capacities are required. Such a joint is ideally suited for use as an adjustable column in construction shoring, for example.

Figure 12:
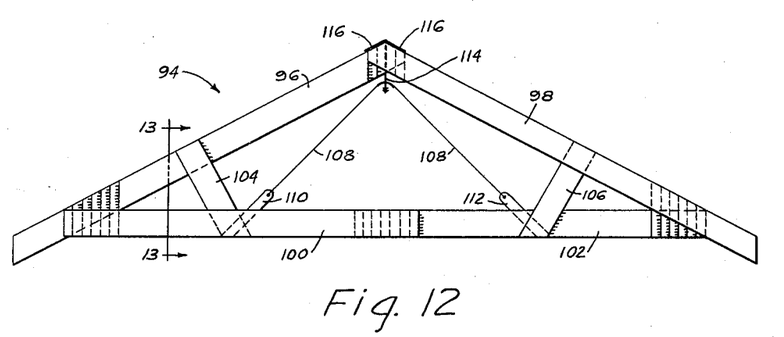
FIG. 12 is a front elevational view of a modified form of a truss construction wherein the tension web members are formed of a metal material and are prestressed.
Figure 13:
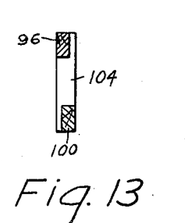
FIG. 13 is a sectional view taken along lines 13—13 in FIG. 12.

Referring now to FIG. 12, a modified form of truss construction is illustrated and is generally indicated at 94. The truss 94 shown in FIG. 12 includes top chord members 96 and 98 and bottom chord members 100 and 102, the top and bottom chord members being formed with teeth adjacent the ends thereof that are adapted to interlock in the area of the overlap of the chord members as described above in connection with the truss illustrated in FIGS. 1 through 5. Compression web members 104 and 106 are further provided in the truss shown in FIG. 12 but do not abut the underside of the top chord members. Instead, the ends of the compression web members are cut or rabbeted in such a way that a portion of the thickness thereof overlaps the associated top and bottom chord members, the chord members 96 and 100, as shown in FIG. 13, being disposed in somewhat spaced overlapping relation with respect to each other and being separated by the compression member 104. The usual wooden tension web members have been replaced in the modified truss construction 94 by a wire or metal band 108 that is secured to metal clips 110 and 112, the metal clips 110 and 112 being directly connected to the lower chord members 100 and 102, respectively. The wire 108 extends over the lowermost end of a pretensioning clip 114 that projects through the peak of the truss and is held between the teeth formed in the top chord members 96 and 98 at the peak joint. The pretensioning clip 114 that defines a modified peak joint is formed with overhanging portions 116 that abut the adjacent edges of the top chord members 96 and 98 and are secured thereto by fastening means, such as nails, screws or the like. The pretensioning clip 114 is adapted to pretension the wire 108 in order to set up initial stresses in the entire assembly. By prestressing the metal members 108, 110 and 112, a tight and fuller engagement of the teeth in all of the wood joints of the truss is insured, particularly since prestressing sets up initial stresses in the joints that are of the same type and in the same direction as they will be under normal loading conditions. The pretensioning device further permits the truss construction to take a predetermined reverse loading force should the design of the truss include such a requirement. The reverse loading force may be in the form of an uplift wind force on the roof truss that is normally designed to carry vertical loads. The metal web or wire member 108 is also advantageous since it is considerably cheaper than wood but has similar strength characteristics. Since there may be some small compression forces in the metal web member 108 due to reverse loading, pretensioning the metal to a stress slightly greater than the expected compression stresses will insure that the metal web member will never be under compression stress after fabrication and assembly thereof. Prestressing the metal web member further insures that the completed truss assembly will retain the joints in tight fitting relation even under handling stresses which might tend to open the connecting joints.

Figure 14:
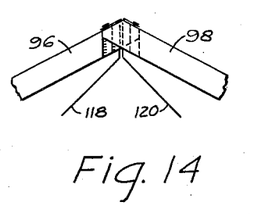
FIG. 14 is a fragmentary front elevational view of a truss showing a modified form of the prestressed tension members.
Figure 15:
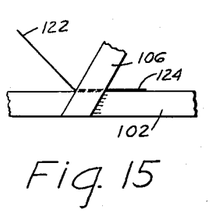
FIG. 15 is a fragmentary view of a truss showing a modified form of the prestressed tension member wherein the end thereof extends between the compression web and the bottom chord member and is secured to the top of the bottom chord member.
Figure 16:
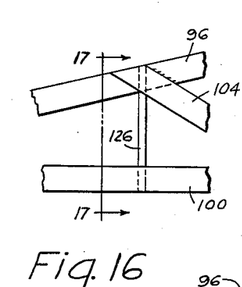
FIG. 16 is a fragmentary view of a modified form of a truss construction showing the use of vertically extending metal tension members.
Figure 17:
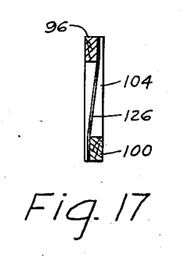
FIG. 17 is a sectional view taken along lines 17—17 in FIG. 16.

Referring now to FIGS. 14 through 18, variations in the pretensioned or prestressed tensioning web members are illustrated. In FIG. 14, for example, the clip 114 has been eliminated, and individual pretension web members 118 and 120 are provided that are joined directly to the bottom chord members 100 and 102, respectively. The web members 118 and 120 extend through the interlocking teeth of the top chord members 96, 98 and are turned over for connection to the uppermost ends of the top chord members by any suitable fastening means, such as staples or nails. Thus it is seen that the tension web members 118 and 120 also define a modified peak joint and not only are pretensioned to set up initial stresses in the overlapping joints of the chord members, but also eliminate the clip at the peak joint to reduce assembly time and costs. In FIG. 15 a modified form of a metal tension web member indicated at 122 extends between the compression web member 106 that is interlocked to the bottom chord member. The lowermost end 124 of the tension web member 122 is fastened to the top of the bottom chord 102 by any suitable means, such as staples or the like, and thereby eliminates the metal clips shown in FIG. 12. In FIG. 16, the wooden compression member 104 is interlocked between the top chord member 94 and bottom chord member 100. In addition, a metal tension web member 126 is provided that extends in a generally vertical direction and is secured to the opposite faces of the top chord member 96 and bottom chord member 100 as more clearly illustrated in FIG. 17. The ends of the wood compression member 104 are also rabbeted or cut out to accommodate the top and bottom chord members 96 and 100 which are disposed in spaced overlapping relation but are separated by the compression member 104.

Figure 18:
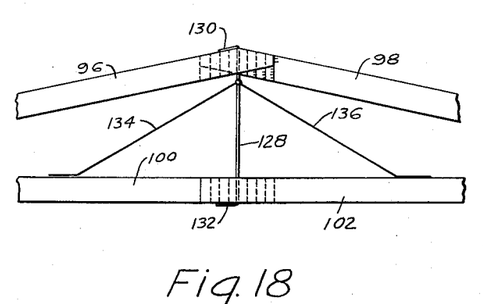
FIG. 18 is a fragmentary elevational view of a modified form of a truss construction wherein a vertically extending tension member is utilized that extends through the peak of the truss and through the overlapping area of the bottom chord members.

In FIG. 18, a further modified form of a peak joint and tension member is illustrated and includes a pretensioning metal member 128 that extends through the peak joint defined by the top chords 96 and 98 and through the interlocking teeth of the bottom chords 100 and 102. Outturned end portions indicated at 130 and 132 may be provided for securing the pretensioned member 128 in position between the top and bottom chords. If desired, additional tensioning straps or strands 134 and 136 may be secured to the metal member 128 and extend therefrom adjacent the peak joint to the bottom chords 100 and 102, respectively. The pretensioned metal member 128, together with the tension strands 134 and 136, are adapted to preload or prestress the joints and thereby provide for setting up initial stresses in the entire assembly. This assures that a tight and fuller engagement of the teeth and all of the wood joints of the truss will be made since the initial stresses in the joints that are set up are of the same type and in the same direction as they will be under normal loading conditions.

In all forms of the truss constructions embodied in the present invention, it is seen that the joints defined by the overlapping members have the unusual capacity to carry the stresses between the members by means of the bearing of the teeth and shear in the wood in the area where the members overlap each other. In effect, the teeth cut from the wood members transfer the stresses between the members at the joints. In fabrication of the truss, the cutting of the teeth in the truss members can be simply done, and as such, the trusses may be economically produced in large-scale production. In forming a truss, two identically shaped top chords and two identically shaped bottom chords could define a single truss assembly, whereas the two compression web members which are also identical require only two cuts, and thus may also be simply formed and assembled. Since the members lap over each other, a large economy can be effected in the cutting operation. Because the joint utilizes the interlocking teeth, no special equipment is needed for assembling the truss, and therefore the assembly operation is considerably more economical than any other system heretofore known. In the prior known systems of assembling trusses, the plates normally utilized therefor required special tables for the assembly with the truss members, and equipment, such as hydraulic or mechanical means, was necessary for holding the truss members before the plates could be pressed in. Although no specific method of prestressing the metal web members is illustrated or described herein, it is contemplated that any well-known technique could be employed, the method of prestressing not forming a part of the present invention. Furthermore, special means of positioning the plates and expensive rollers or presses were necessary to press the teeth of the plates or nails into the chord members of these prior known trusses. By utilizing the present invention, the labor required for assembling the truss members is a fraction of the time required for assembling the members in the prior known trusses. The present truss can also be assembled in a single position and does not have to be turned over as it was necessary to be done in other systems when hand hammering, stapling, gluing or positioning of the plates was necessary. Since the teeth in the coacting chord members in the present invention are formed with the same tool, they will tightly interact and form a tight joint, thereby assuring that there will be no possibility of weakness in the truss. The overlapping teeth in the chord members also have the further advantage of being pulled into tighter engagement upon increase in pressure on the components of the truss. In the prior known monoplane truss the heel joint required special long cuts on the ends of the top and bottom chord members, which cuts, if slightly off the required angle, would seriously impair the load carrying capacity of the joint, since the bearing surfaces between the chord members would be reduced. The present invention requires no long cuts which must match to very close tolerances, and since the teeth in each truss member are precut, an exact fitting of the required truss will be made with a minimum of time and labor.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. In a truss assembly for use in a building construction, bottom chord members for carrying tension stresses formed of wood, top chord members carrying compression stresses formed of wood and being joined to said bottom chord members to define heel joints therewith, and web members interposed between said top and bottom chord members and joined thereto intermediate the ends thereof, said heel joints being defined by an area of overlap of a side face of each said top and bottom chord members, said overlapping side faces being substantially vertical and being disposed in opposed relation, and said area of overlap including teeth cut into the adjacent opposing overlapping side faces of said top and bottom chord members, the apices of said teeth extending in a generally vertical direction, said teeth of said opposed side faces interlocking to define wood-to-wood connections and carrying the stresses between said top and bottom chord members and developing the full shear strength required of each chord member in the area of the overlap thereof, and means for securing said overlapping members together.

2. In a truss construction having at least one top chord member for carrying compression stresses and at least one bottom chord member for carrying tension stresses, said top and bottom chord members including substantially vertical side faces that are disposed in opposed relation, said top and bottom chord members being joined together adjacent the outermost ends thereof to form a heel joint, said heel joint being defined by said substantially vertical side faces that are disposed in opposed and overlapping relation, teeth being formed in said opposed overlapping side faces in the material from which said chord members are formed and being interlocked to positively interengage said top and bottom chord members, wherein the area of overlap of said chord members defines a joint that develops the full shear strength required of each chord member, the apices of said teeth extending in a generally vertical direction, and means for securing said chord members together in overlapping relation.

3. In a structural truss for use in a building construction, at least one top chord member for carrying compression stresses and at least one bottom chord member for carrying tension stresses when said truss is under load, said top and bottom chord members including opposed, substantially vertical faces that overlap and that are formed with teeth the apices of which extend in a generally vertical direction, said teeth being cut out of the material from which the chord members are formed and being disposed in interlocking relation wherein the chord members are postively interlocked in the opposed overlapping portions thereof, each of said teeth having a sawtooth configuration and including a bearing surface and a shear plane that is defined by the distance between the base of adjoining teeth, the shear plane having a dimension that is greater than the length of said bearing surface.

4. In a structural truss, a pair of top chord members being joined at one end thereof by a joint defining the peak of said truss, bottom chord members connected to said top chord members at the other ends thereof to define heel joints therewith, and web members interconnecting said top chord members and said bottom chord members, each of the heel joints that connect said top chord members and bottom chord members being defined by a substantially vertical face of a top chord member and a substantially vertical face of a bottom chord member, the vertical faces of said top and bottom chord members being located in overlapping and opposed relation and having a plurality of teeth formed therein, the apices of said teeth extending in a generally vertical direction, the teeth formed in the vertical face of a top chord member interengaging the teeth formed in an opposed vertical face of a bottom chord member in the overlapping area thereof.

5. In a truss as set forth in claim 4, each of said web members including a substantially vertical face that is formed with generally vertically extending teeth thereon and that overlaps one of said chord members, the face of each chord member that overlaps a face of a web member being formed with complementary generally vertically extending teeth for interengaging the teeth formed in the overlapping face of said web member.

6. In a structural joint as set forth in claim 4, said teeth having a saw-tooth configuration.

7. In a structural joint as set forth in claim 4, said teeth having a corrugated configuration.

8. In a structural joint as set forth in claim 4, said teeth having a square configuration.

9. In a structural joint as set forth in claim 4, said teeth having a truncated saw-tooth configuration.

10. In a structural truss having top chord members carrying compression stresses and bottom chord members carrying tension stresses, said top and bottom chord members including substantially vertically extending faces that are located in opposed relation and that are joined in overlapping relation adjacent the outer ends thereof to form heel joints, said heel joints being defined by interlocking teeth that are formed in the material from which said bottom and top chord members are constructed and in the area of the overlap thereof, the apices of said teeth extending in a generally vertical direction, said interlocking teeth being cut in the opposing vertically extending faces of said chord members and being located in direct interlocking relation so as to provide for the development of the full shear strength required of said members in the area of the overlap thereon when a vertical load is applied to said truss, the lowermost portions of said top chord members extending beyond the outermost ends of said bottom chord members so as to define an overhang, web members interconnecting said top and bottom chord members, at least one vertically extending face of each of said web members including a plurality of teeth formed therein that interlock with similarly formed teeth in the chord member with which said web member overlaps, and means for securing said overlapping members together.

11. In a structural truss having top chord members carrying compression stresses and bottom chord members carrying tension stresses, and a substantially vertically extending face of each top and bottom chord members being located in opposed relation and being joined adjacent the outer ends thereof in an overlapping area to define heel joints, said heel joints being defined by interlocking teeth that are formed in the material from which said bottom and top chord members are constructed and in the opposing vertical faces in the area of the overlap thereof, the apices of said teeth extending in a generally vertical direction, said interlocking teeth providing for the development of the full shear strength required of said members in the area of the overlap thereof when a vertical load is applied to said truss, and web members interconnecting said top and bottom chord members and acting to resist tension and compression stresses, said web members including a compression web member engaging one of said top chord members and the adjacent bottom chord member, opposite vertically extending faces of said compression web member being cut out at the ends thereof so that said compression web member overlaps opposite side faces of said top and bottom chord members, and at least one prestressed tension web member formed of a metal material extending from a top chord member to a bottom chord member, said prestressed metal tension member insuring a tighter engagement of said interlocking teeth joints and permitting the truss to absorb a predetermined reverse loading force.

12. In a structural truss as set forth in claim 11, said metal tension web member extending from a top chord member intermediate the ends thereof to a bottom chord member and being disposed in a generally vertical position.

13. In a structural truss having top chord members carrying compression stresses and bottom chord members carrying tension stresses, said top and bottom chord members having opposed substantially vertically extending faces that are joined adjacent the outer ends thereof to form overlapping heel joints, said heel joints being defined by interlocking teeth that are formed in said opposed vertically extending faces in the material from which said bottom and top chord members are constructed and in the area of the overlap thereof, the apices of said teeth extending in a generally vertical direction, said interlocking teeth providing for the development of the full shear strength required of said members in the area of the overlap thereof when a vertical load is applied to said truss, pretensioned metal web members interconnecting said top and bottom chord members, and a clip secured to the peak joint of said truss and to said pretensioned metal web members and cooperating therewith to insure that said interlocking teeth will be more firmly engaged under load.

14. In a structural truss as set forth in claim 13, compression web members interengaging said top and bottom chord members and cut out at the point of engagement therewith so that said top and bottom chord members are located in spaced overlapping relation.

15. In a structural truss having top chord members carrying compression stresses and bottom chord members carrying tension stresses, said top and bottom chord members including opposing substantially vertical faces that are overlapped adjacent the outer ends thereof to form heel joints, said heel joints being defined by interlocking teeth that are formed in said opposing, overlapping faces, the apices of said teeth extending in a generally vertical direction, and metal tension members engaging said top and bottom chord members and being prestressed for setting up initial stresses in said chord members, thereby providing for tighter and fuller interlocking engagement of said teeth.

16. In a structural truss as set forth in claim 15, at least one of said metal tension members being positioned in vertical relation and extending from opposed substantially vertical faces of said top chord members that are located in overlapping relation to opposed substantially vertical faces of said bottom chord members that are located in overlapping relation, said metal tension member being locked between said opposing overlapping faces of said top chord members and said bottom chord members.

17. A structural truss comprising top chord members that are inclined and that have teeth formed in substantially vertical opposed faces adjacent the ends thereof and in the material from which said top chord members are constructed, the upper ends of said top chord members overlapping so that the opposing faces that have the teeth formed therein overlap and interlock to define a peak joint, the interlocking teeth in the opposing faces of said top chord members acting to resist the compression stresses in said top chord members when said truss is under load, and bottom chord members located in a generally horizontal position and having teeth cut in opposing substantially vertical faces at one end thereof, the teeth formed in the opposing faces at said one end of said bottom chord members interlocking at the center point of said truss, and the teeth formed in the substantially vertical faces at the other ends of said bottom chord members interlocking with the teeth formed in the opposing faces on the lower end of the adjacent top chord members to define heel joints, the teeth defining the joint between said bottom chord members acting to resist tension stresses, the apices of said teeth formed in said top and bottom chord members extending in a generally vertical direction, the uncut portions of said top and bottom chord members being sufficient to resist bending stresses when said truss is under load, and means for securing said chord members together in overlapping relation.

18. A prefabricated structural truss for use in a building construction, comprising a pair of inclined top chord members formed of wood, the upper ends of each of said top chord members being formed with a plurality of teeth in a substantially vertical face thereof, the faces in which said teeth are formed being located in opposed relation and being overlapped so that said teeth interlock to form a wood-to-wood peak connection that resists the compression forces in said top chord members when said truss is under load, bottom chord members formed of wood and being formed with a plurality of teeth in a substantially vertical face at one end thereof, the lower ends of the top chord members having corresponding teeth formed in a substantially vertical face thereof that opposes the vertical face of the adjacent bottom chord member that has the teeth formed therein, the opposing faces of said top and bottom chord members overlapping so that the corresponding teeth formed therein interlock to form a wood-to-wood heel joint that resists the combined compression and tension forces exerted on said top and bottom chord members, respectively, said heel joints thereby developing the full shear strength required of said chord members when said truss is under load, the other ends of said bottom chord members having opposed substantially vertical faces that are formed with teeth, the opposed faces of said bottom chords overlapping so that the teeth formed therein interlock to form a wood-to-wood tension joint, the apices of the teeth formed in the substantially vertical faces of said top and bottom chord members extending in a generally vertical direction, and means for securing said chord members together in overlapping and interlocking relation.

19. A prefabricated truss as set forth in claim 18, the area of said top chord members intermediate the toothed areas that are formed therein adjacent the ends thereof being uncut, wherein the cross section of said intermediate area is not reduced, the unreduced intermediate area defining the point where maximum stresses occur when the truss is under load and thereby acting to effectively resist said stresses.

20. In a prefabricated structural truss for use in a building construction, a pair of inclined top chord members formed of wood, each of said wood top chord members having a plurality of teeth formed in a susbtantially vertical face adjacent the upper end thereof, the vertical faces of said top chord members that have the teeth formed therein being located in opposed relation and overlapping so that said teeth interlock to form a wood-to-wod peak connection that resists the compression forces in said top chord members when said truss is under load, at least two bottom chord members formed of wood, each of said wood bottom chord members having a plurality of teeth formed in a substantially vertical face thereof adjacent an end thereof, the lower end of each of said top chord members having coresponding teeth formed in a vertical face that is opposed to the vertical face of an adjacent bottom chord member in which the teeth are formed, the opposing vertical faces of said top and bottom chord members that have the teeth formed therein overlapping, the apices of the teeth formed in the vertical faces of said top and bottom chord members extending in a generally vertical direction, the lowermost ends of said top chord members extending beyond the outer end of the adjacent bottom chord member to define an overhang for said truss, said teeth in said overlapping top and bottom chord members interlocking to form wood-to-wood heel joints that resist the combined compression and tension forces impressed on said top and bottom chord members, respectively, said heel joints thereby developing the full shear strength required of said chord members when said truss is under load, and means for securing said chord members together in overlapping relation.

21. A prefabricated structural truss comprising a plurality of wood compression members, a plurality of wood tension members, each of said members having a susbtantially vertically extending face in which a plurality of teeth are formed, the apices of said teeth extending in a generally vertical direction, each of said compression members overlapping a tension member, so that the vertically extending faces thereof in which said teeth are formed are in opposed relation, the teeth formed in said overlapping members interlocking in the area of the overlap to define a wood-to-wood connection wherein said wood-to-wood connection develops the full shear strength required of the overlapping tension and compression members when said truss is under load, and means for securing said members together in overlapping and interlocking relation.

22. A prefabricated structural truss for use in a building construction comprising a plurality of compression members in which a plurality of teeth are formed in a toothed area in a substantially vertically extending side face adjacent an end thereof, a plurality of tension members in which a plurality of teeth are formed in a toothed area in a substantially vertically extending side face adjacent an end thereof, the apices of said teeth extending in a generally vertical direction, the substantially vertical side face of at least one of said tension members overlapping the substantially vertical side face of one of said compression members, the side faces of said overlapping tension and compression members being disposed in opposed relation and the teeth formed therein interlocking to define a connection for resisting the combined compression and tension forces impressed on the overlapping members, said connection thereby developing the full shear strength required of said overlapping members when said truss is under load, and means for securing said overlapping members together in overlapping and interlocking relation.

23. A prefabricated structural truss as set forth in claim 22, one of said tension members having teeth, the apices of which extend in a generally vertical direction, formed in both vertical side faces adjacent an end thereof, and parallel extending tension members each having teeth, the apices of which extend in a generally vertical direction, formed in a vertical side face that is located in opposed relation to a vertical side face of the tension member that has the teeth formed in both vertical side faces thereof, the opposing faces of said parallel extending and latter named tension members overlapping and being interlocked by the teeth formed therein, the bearing surfaces of the teeth formed in the side faces of said parallel and latter named tension members being generally transverse to the direction of tension stresses applied thereto.

24. A prefabricated structural truss as set forth in claim 22, one of said compression members having teeth, the apices of which extend in a generally vertical direction, formed in both vertical side faces adjacent an end thereof, and parallel extending compression members each having teeth, the apices of which extend in a generally vertical direction, formed in a vertical side face that is located in opposed relation to a vertical side face of the compression member that has the teeth formed in both vertical side faces thereof, the opposing faces of said parallel extending and latter named compression members overlapping and being interlocked by the teeth formed therein, the bearing surfaces of the teeth formed in the side faces of said parallel and latter named compression members being generally transverse to the direction of compression stresses applied thereto.

25. In a prefabricated structural truss for use in the fabrication of a building construction, a plurality of wood compression members, a plurality of wood tension members, each of said members having a substantially vertically extending face in which a plurality of teeth are formed, the apices of said teeth extending in a generally vertical direction, at least one of said compression members overlapping a tension member, so that the vertically extending faces thereof in which said teeth are formed are in opposed relation, the teeth formed in said overlapping members interlocking in the area of the overlap to define a wood-to-wood connection and interengaging said members so that the opposing stresses which tend to move said members relative to each other and in a direction parallel to said faces when said truss is under load are effectively resisted, and means for securing said members together in overlapping and interlocking relation.

References Cited in the file of this patent

UNITED STATES PATENTS

| | | |
|---|---|---|
| 1,289,147 | Forsell | Dec. 31, 1918 |
| 1,926,202 | Kelly | Sept. 12, 1933 |
| 1,937,852 | Steck | Dec. 5, 1933 |

FOREIGN PATENTS

| | | |
|---|---|---|
| 17,338 | Denmark | May 26, 1913 |
| 77,435 | Austria | July 25, 1919 |
| 279,096 | Great Britain | Jan. 14, 1929 |
| 168,419 | Austria | June 11, 1951 |
| 197,058 | Austria | Apr. 10, 1958 |

OTHER REFERENCES

American Builder, July 1954, page 53.